United States Patent
Ananthanarayanan et al.

(10) Patent No.: US 9,466,033 B2
(45) Date of Patent: Oct. 11, 2016

(54) SELF-ADAPTIVE CLASSIFIERS

(71) Applicant: International Business Machines Corporation, Armonk, NY (US)

(72) Inventors: Rema Ananthanarayanan, New Delhi (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/594,808

(22) Filed: Jan. 12, 2015

(65) Prior Publication Data

US 2016/0203414 A1    Jul. 14, 2016

(51) Int. Cl.
*G06F 15/18* (2006.01)
*G06N 99/00* (2010.01)

(52) U.S. Cl.
CPC .................. *G06N 99/005* (2013.01)

(58) Field of Classification Search
USPC .......................................................... 706/12
See application file for complete search history.

(56) References Cited

U.S. PATENT DOCUMENTS

| | | | |
|---|---|---|---|
| 8,190,537 B1 | 5/2012 | Singh et al. | |
| 8,494,995 B2 * | 7/2013 | Deshpande | G06Q 10/0633 706/46 |
| 8,533,222 B2 | 9/2013 | Breckenridge et al. | |
| 8,639,645 B2 * | 1/2014 | Deshpande | G06Q 10/0633 706/46 |
| 8,799,893 B2 * | 8/2014 | Sethi | G06F 8/63 709/220 |
| 8,819,679 B2 * | 8/2014 | Agarwal | G06F 9/5072 717/176 |
| 8,856,787 B2 * | 10/2014 | Agarwal | G06F 9/06 717/176 |
| 8,904,224 B2 * | 12/2014 | Kalyanaraman | H04L 67/1095 714/4.11 |
| 8,949,830 B2 * | 2/2015 | Kannan | G06F 9/45558 718/1 |

(Continued)

OTHER PUBLICATIONS

A Scoring Scheme for Online Feature Selection: Simulating Model Performance Without Retraining Debarka Sengupta; Sanghamitra Bandyopadhyay; Debajyoti Sinha IEEE Transactions on Neural Networks and Learning Systems Year: 2016, vol. PP, Issue: 99 pp. 1-10, DOI: 10.1109/TNNLS.2016.2514270 IEEE Early Access Articles.*

(Continued)

*Primary Examiner* — Michael B Holmes
(74) *Attorney, Agent, or Firm* — Ference & Associates LLC (57) ABSTRACT

Methods and arrangements for reconfiguring an analytics model without retraining the analytics model. A contemplated method includes: providing a cloud-based classifier which performs analytics on input data, the classifier including an analytics model; receiving a first data set at the classifier, wherein the first data set is a training data set; via the analytics model, discovering features in the first data set; receiving a second input data set at the classifier; via the analytics model, discovering one or more new features in the second input data set; and reconfiguring the analytics model, without retraining the analytics model, based on one or more new features discovered in the second input data set. Other variants and embodiments are broadly contemplated herein.

20 Claims, 3 Drawing Sheets

(56) References Cited

U.S. PATENT DOCUMENTS

| | | | |
|---|---|---|---|
| 8,990,371 B2* | 3/2015 | Kalyanaraman | H04L 67/34 709/221 |
| 8,996,675 B2* | 3/2015 | Kalyanaraman | H04L 67/34 709/221 |
| 9,003,222 B2* | 4/2015 | Bhamidipaty | G06F 11/302 714/2 |
| 9,015,665 B2* | 4/2015 | Kannan | G06F 8/10 717/123 |
| 9,043,220 B2* | 5/2015 | Jacob Sushil | G06Q 30/02 705/7.29 |
| 9,047,615 B2* | 6/2015 | Jacob Sushil | G06Q 30/02 |
| 9,098,600 B2* | 8/2015 | Chetuparambil | G06Q 30/0256 |
| 9,219,692 B2* | 12/2015 | Kannan | H04L 47/18 |
| 9,292,872 B2* | 3/2016 | Jacob Sushil | G06Q 30/0621 |

OTHER PUBLICATIONS

Secure Data Analytics for Cloud-Integrated Internet of Things Applications Heshan Kumarage; Ibrahim Khalil; Abdulatif Alabdulatif; Zahir Tari; Xun Yi IEEE Cloud Computing Year: 2016, vol. 3, Issue: 2 pp. 46-56, DOI: 10.1109/MCC.2016.30 IEEE Journals & Magazines.*

Content-Based Image Retrieval on reconfigurable Peer-to-Peer networks Chun-Rong Su; Jiann-Jone Chen Multimedia Signal Processing (MMSP), 2012 IEEE 14th International Workshop on Year: 2012 pp. 343-348, DOI: 10.1109/MMSP.2012.6343466 IEEE Conference Publications.*

Exploiting Analytics Shipping with Virtualized MapReduce on HPC Backend Storage Servers Cong Xu; Robin Goldstone; Zhuo Liu; Hui Chen; Bryon Neitzel; Weikuan Yu IEEE Transactions on Parallel and Distributed Systems Year: 2016, vol. 27, Issue: 1 pp. 185-196, DOI: 10.1109/TPDS.2015.2389262 IEEE Journals & Magazines.*

Yang, Jun, "A General Framework for Classifier Adaptation and its Applications in Multimedia", Thesis, Language Technologies Institute, School of Computer Science, Carnegie Mellon University, Pittsburgh, PA, USA, 2009, 155 pages.

Roth, Dan, "Adaptation without Retraining", Cognitive Computation Group, Dept. of Computer Science, University of Illinois at Urbana-Champaign, 39 pages, Accessed on Dec. 15, 2014, Copy available at: http://www.google.co.in/url?sa=t&rct=j&q=&esrc=s&source=web&cd=1&ved=0CB4QFjAA&url=http%3A%2F%2FI2r.cs.uiuc.edu%2F~danr%2FTalks%2FRoth-Adaptation-NIPS-Wrkshp-2011.pptx&ei=rkcFVK6fE8WzuAT0sID4BQ&usg=AFQjCNGt_3yNQhUfvGUDfEtbsYLEA-fROQ&sig2=QVa9e43Arf8KHsKRn94AkQ&bvm=bv.74115972,d.c2E).

Lowd, Daniel et al., "Adversarial Learning", Proceedings of the eleventh ACM SIGKDD International Conference on Knowledge Discovery in Data Mining (KDD '05), Aug. 21-24, 2005, Chicago, Illinois, USA, pp. 641-647, ACM Digital Library.

* cited by examiner

SELF-ADAPTIVE CLASSIFIERS

BACKGROUND

Currently, Analytics as a Service (AaaS) represents one of the fastest evolving services on the cloud, normally embodied by a cloud platform that provides analytics. Usually, in most services, such analytics are performed by classifiers, that is, components or modules configured to undertake data analysis via an analytics model.

A recurrent problem involves the on-boarding of many analytical services onto the cloud. Normally, a customer provides data on which analytics are then performed on the cloud, based on an already existing analytics framework (or model) at a classifier. These models are typically configured for a highly specified use, built on the basis of predetermined first data sets. In other words, the models tend to assume the use of specific types or features of data and do not prove to be highly flexible or versatile.

Generally, analysis based on a model built from a training set assumes that subsequent incoming data sets will conform to the parameters of the training set. In a multi-tenant setting, a cloud provider even needs to tailor its analytics (and classifiers) to meet the data availability of each tenant even for the same analytics.

A challenge thus emerges when data sets evolve, even slightly, as conventional analytics models on the cloud may not be readily configured to adapt to such changes. Accordingly, there is little recourse short of retraining an entire model. Beyond the time involved, domain expertise may well be required to assist in such retraining, leading to a potentially cumbersome and expensive process.

BRIEF SUMMARY

In summary, one aspect of the invention provides a method of reconfiguring an analytics model without retraining the analytics model, the method comprising: utilizing at least one processor to execute computer code configured to perform the steps of: providing a cloud-based classifier which performs analytics on input data, the classifier including an analytics model; receiving a first data set at the classifier, wherein the first data set is a training data set; via the analytics model, discovering features in the first data set; receiving a second input data set at the classifier; via the analytics model, discovering one or more new features in the second input data set; and reconfiguring the analytics model, without retraining the analytics model, based on one or more new features discovered in the second input data set.

Another aspect of the invention provides an apparatus for reconfiguring an analytics model without retraining the analytics model, the apparatus comprising: at least one processor; and a computer readable storage medium having computer readable program code embodied therewith and executable by the at least one processor, the computer readable program code comprising: computer readable program code configured to provide a cloud-based classifier which performs analytics on input data, the classifier including an analytics model; computer readable program code configured to receive a first data set at the classifier, wherein the first data set is a training data set; computer readable program code configured, via the analytics model, to discover features in the first data set; computer readable program code configured to receive a second input data set at the classifier; computer readable program code configured, via the analytics model, to discover one or more new features in the second input data set; and computer readable program code configured to reconfigure the analytics model, without retraining the analytics model, based on one or more new features discovered in the second input data set.

An additional aspect of the invention provides a computer program product for reconfiguring an analytics model without retraining the analytics model, the computer program product comprising: a computer readable storage medium having computer readable program code embodied therewith, the computer readable program code comprising: computer readable program code configured to provide a cloud-based classifier which performs analytics on input data, the classifier including an analytics model; computer readable program code configured to receive a first data set at the classifier, wherein the first data set is a training data set; computer readable program code configured, via the analytics model, to discover features in the first data set; computer readable program code configured to receive a second input data set at the classifier; computer readable program code configured, via the analytics model, to discover one or more new features in the second input data set; and computer readable program code configured to reconfigure the analytics model, without retraining the analytics model, based on one or more new features discovered in the second input data set.

A further aspect of the invention provides a method comprising: providing a classifier which performs analytics on input data sets, the classifier including an analytics model; inputting a first data set, wherein the first data set is a training data set; assigning weights to features discovered in the first data set; receiving a second input data set; and reconfiguring the analytics model based on one or more new features discovered in the second input data set, wherein the reconfiguring comprises at least one of: modifying the analytics model and building an extension to the analytics model; determining weights for the one or more new features discovered in the second input data set; reconfiguring the analytics model based on weights determined for the one or more new features discovered in the second input data set; and recalculating the weights for the features discovered in the first data set.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are methods and arrangements which provide a classifier, with a constituent analytics model, that performs analytics on data sets based on feature sets of the data, wherein weights are optionally associated with various features in the feature sets. New data sets that include additional features can also be analyzed with the same model and/or on the basis of some extensions or modifications to the model. Also, new data sets that present a reduced number of features can be analyzed with the same model and/or on the basis of some extensions or modifications to the model.

The attributes discussed above, and others, relating to at least one embodiment of the invention, will be better appreciated from the discussion which follows.

In accordance with at least one embodiment of the invention, an existing analytics model is retained, with peripheral actions performed thereupon. Here, data features are catalogued and these are then retained in order to assist in accommodating changes to incoming data sets. Accordingly, to the extent that data features are catalogued, the feature set is studied and relative weights are applied to individual features. A Build Label function is then applied to an output/functionality expectation for each level of the weighted features set. For example, these expectations can be appended and expressed as follows:

Functionality 1<->Feature Set {A1, A2, A3}
Functionality 2<->Feature Set {A1, A2, A3, A4, A5}
Functionality 3<->Feature Set {A6, A7, A8}

In accordance with at least one embodiment of the invention, the model is then exposed through cataloguing services (e.g., SSC or Standard Service Catalog). Data matching is input to the feature set, and functionality is exposed for the available features set.

To elaborate, in accordance with at least one embodiment of the invention, it can be noted that classifiers are typically built assuming a set of features. In supervised learning, a model is built using a first data set and subsequent inputs are assigned labels based on the model. In unsupervised learning, there is no training set, but the model can still assume a set of features. Generally, it can be assumed herein that no information is available regarding the training set or how the model is built. The only available information thus includes the mapping function itself (i.e., the analytics model) and knowledge that, given a set of inputs, a class label is outputted. Otherwise, features of interest for the analytics model are known.

Figure 1:
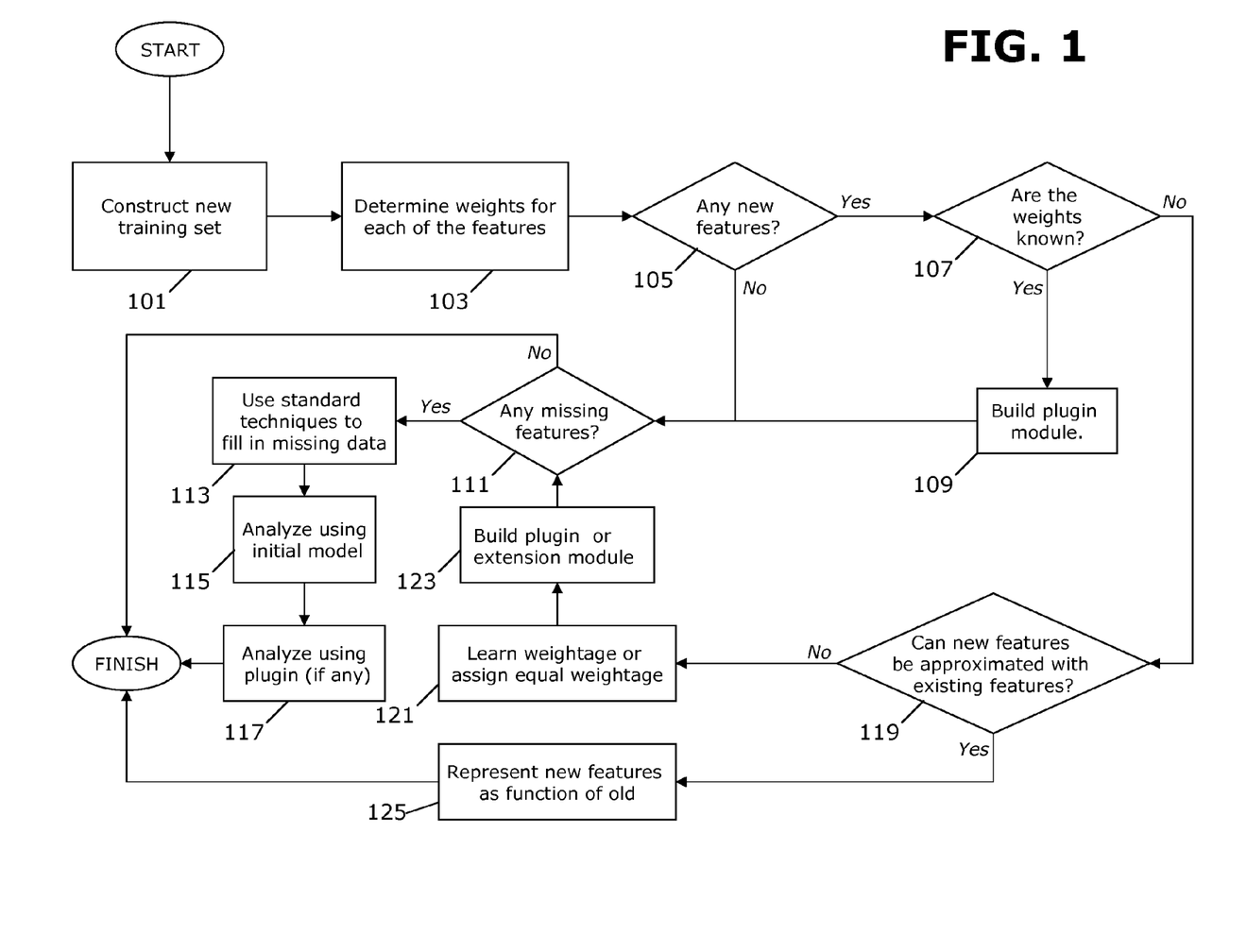
FIG. 1 schematically illustrates a process of re-using an existing analytics model.

In accordance with at least one embodiment of the invention, FIG. 1 schematically illustrates such a process of re-using an existing analytics model. As will be seen, the model can be extended as needed to capture weights for new features.

In accordance with at least one embodiment of the invention, as shown, a new data training set is constructed (101), and weights are determined for each of the data features (103). If it is determined (105) that any new features exist, a determination is made (107) as to whether weights for such features are known. If the weights are known, a plugin module is built (109). At this point, or if it was determined at step 105 that no new features exist, then a determination is made (111) as to whether there are any missing features. If so, standard techniques can be employed to fill in missing data (113). Some standard techniques that can be used to fill in the missing data include: using mean or mode values for the missing data, based on existing data sets; or determining the closest or most similar rows or tuples in existing data sets and filling in with values from those rows. The data as a whole are then analyzed using the initial (existing) analytics model (115) and, if necessary, analytics are performed via the plugin (117).

In accordance with at least one embodiment of the invention, if weights for new features are not known, a determination is made (119) as to whether the new features can be approximated with existing features. If not, weightage for such features is learned (121) and a plugin or extension module is built (123); the determination is then made as to whether any features are missing (111). Step 121 may be considered a "reverse engineering" or "re-engineering" of weights. If new features can be approximated with existing features, then the new features are represented as a function of older or existing features (125). Such an approximation may be undertaken, e.g., via matching by way of semantic similarity or expressing the new features as a function of the older or existing features.

In accordance with at least one embodiment of the invention, a plugin or extension module, as discussed hereabove with respect to steps 109, 117 and 123, can be built or added as a useful element when new features are represented not as functions of existing features, but independently. The plugin or extension module thus supplements the existing analytics model and effectively extends the functions of that model. The plugin or extension module can essentially take on any suitable form as fits the context and/or analytics model at hand.

Figure 2:
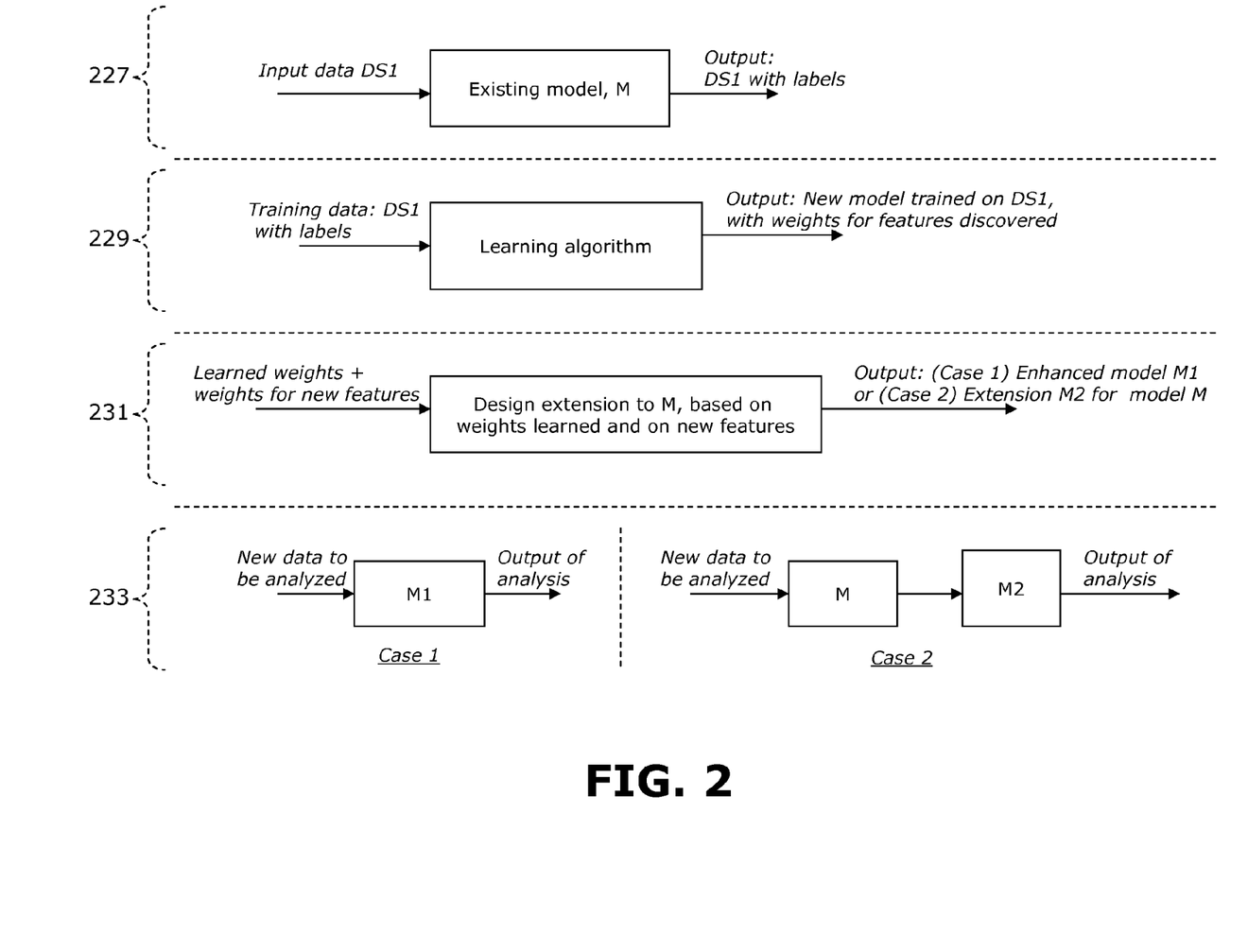
FIG. 2 schematically illustrates a working example of re-using an existing analytics model.

FIG. 2 schematically illustrates a working example of re-using an existing analytics model, in accordance with at least one embodiment of the invention. As shown, in a first step (227), data (notated as data set DS1) are input into an existing model (M), wherein the data set (DS1) is then output with labels. In a second step (229), the data set DS1 with labels is used as training data for input into a learning algorithm. The output is then a new model trained on DS1, with weights for the features discovered by re-engineering from the existing model (thus, learnt weights). In a third step (231), learnt weights and weights for new features are provided as input, and extension or modification to (M) is designed based on the learned weights and on the new features. (By way of example, the learning of weights can correspond to step 121 in FIG. 1.) Output may then assume one of two forms: an enhanced model (M1) or an extension (M2) for model (M). A fourth step (233) illustrates what can then be done with the output of the third step 231. Here, two possible cases (Case 1 and Case 2) can be involved. In the first case (Case 1), enhanced model (M1) is used to accommodate new data to be analyzed, and then to output the results of such analysis. In the second case (Case 2), new data to be analyzed are run through the original model (M) and the model extension (M2) before the analysis is outputted.

In accordance with at least one embodiment of the invention, one manner of executing step 231 can involve building an extension or modification (enhancement) to the existing model M in a manner now to be described with reference to a specific working example. Once new weights are learned or reverse-engineered, consider a model M built on the basis of 4 features. A new data set is then to be analyzed, and this data set has 2 additional features. Weights for the original 4 features have already been computed in step 229. To provide an enhanced model in step 231 (Case 1), weights for the 2 new features are specified, relative to the original 4 features. As such, in the new model M1, 6 total weights can be recomputed, where each weight is now modified or reweighted as the current weight divided by the sum of all the weights. To provide a model extension (M2) as in Case 2, weights for the 2 new features are specified in absolute terms. A new model M2 is then built based on these 2 new weights. In step 233, the output from the model M (with reconstructed weights) is then run through M2 along with the 2 new features. It should be appreciated, generally, that if weights for the new features are not known, and if no training information is specified, then no meaningful analytics can be undertaken.

It can be appreciated from the foregoing that, in accordance with at least one embodiment of invention, a technical improvement is represented via provision of a classifier, with a constituent analytics model, that performs analytics on data sets based on feature sets of the data, wherein weights are optionally associated with various features in the feature sets, and wherein new data sets that include additional features can also be analyzed with the same model and/or on the basis of some extensions or modifications to the model, all without retraining the analytics model.

In view of the foregoing, it can be appreciated that various advantages may be enjoyed in accordance with at least one embodiment of the invention. For instance, there is accorded herein an advantage wherein new analytics service models, both prescriptive and descriptive, are able to re-use existing models for new data sets, based on reverse-engineering the existing models and constructing minor extensions as needed, without retraining. There is further accorded herein an ability to expose the functionality or performance of analytical services as a function of input features provided.

In accordance with at least one embodiment of the invention, very generally, quantitative values as determined herein, or other data or information as used or created herein, can be stored in memory or displayed to a user on a screen, as might fit the needs of one or more users.

Figure 3:
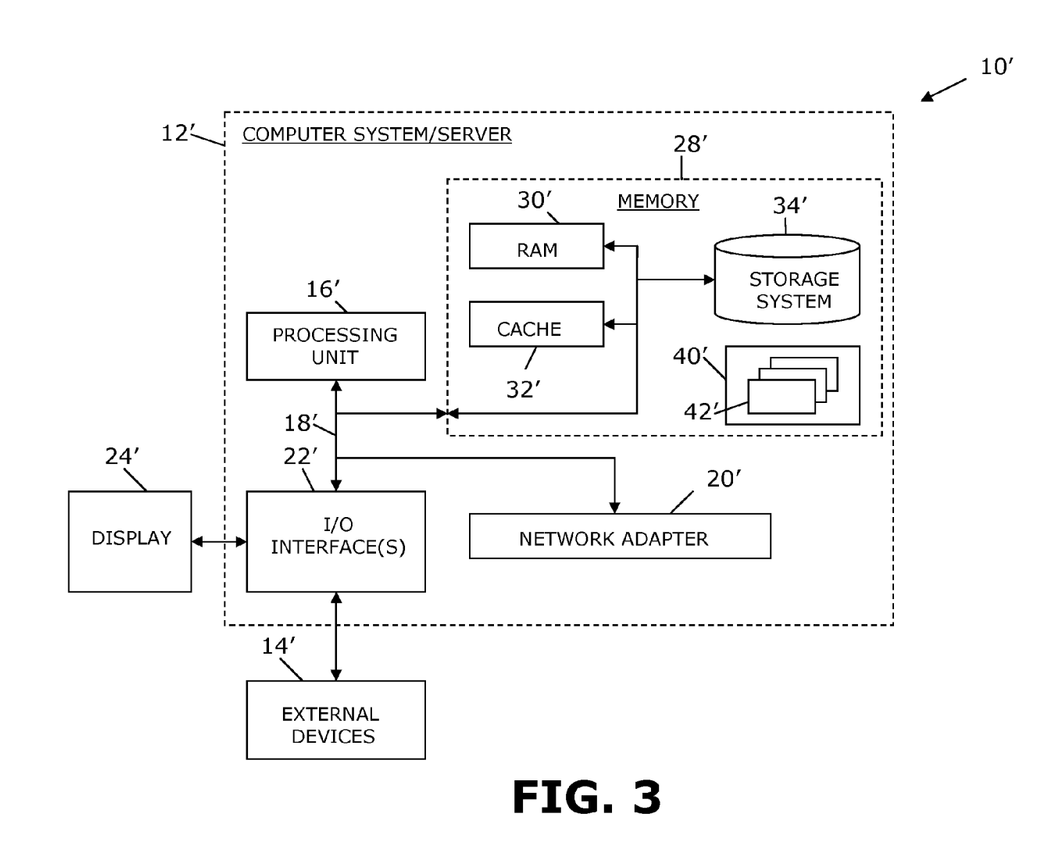
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of reconfiguring an analytics model without retraining the analytics model, said method comprising:
utilizing at least one processor to execute computer code configured to perform the steps of:
providing a cloud-based classifier which performs analytics on input data, the classifier including an analytics model;
receiving a first data set at the classifier, wherein the first data set is ha training data set;
via the analytics model, discovering features in the first data set;
receiving a second input data set at the classifier;
via the analytics model, discovering one or more new features in the second input data set; and
reconfiguring the analytics model, without retraining the analytics model, based on one or more new features discovered in the second input data set.

2. The method according to claim 1, wherein said reconfiguring comprises modifying the analytics model.

3. The method according to claim 1, wherein said reconfiguring comprises building an extension to the analytics model.

4. The method according to claim 1, comprising:
assigning weights to the features discovered in the first data set;
said reconfiguring comprising determining weights for the one or more new features discovered in the second input data set.

5. The method according to claim 4, wherein said reconfiguring comprises reconfiguring the analytics model based on weights determined for the one or more new features discovered in the second input data set.

6. The method according to claim 4, wherein said reconfiguring comprises recalculating the weights for the features discovered in the first data set.

7. The method according to claim 6, wherein said reconfiguring comprises additionally recalculating the weights determined for the one or more new features discovered in the second input data set.

8. The method according to claim 4, wherein said recalculating comprises dividing the weights for the features discovered in the first data set by a sum of weights.

9. The method according to claim 4, wherein said determining of weights for the one or more new features comprises determining weights as a function of the weights assigned to features discovered in the first data set.

10. An apparatus for reconfiguring an analytics model without retraining the analytics model, said apparatus comprising:
at least one processor; and
a computer readable storage medium having computer readable program code embodied therewith and executable by the at least one processor, the computer readable program code comprising:
computer readable program code configured to provide a cloud-based classifier which performs analytics on input data, the classifier including an analytics model;
computer readable program code configured to receive a first data set at the classifier, wherein the first data set is a training data set;
computer readable program code configured, via the analytics model, to discover features in the first data set;
computer readable program code configured to receive a second input data set at the classifier;
computer readable program code configured, via the analytics model, to discover one or more new features in the second input data set; and
computer readable program code configured to reconfigure the analytics model, without retraining the analytics model, based on one or more new features discovered in the second input data set.

11. A computer program product for reconfiguring an analytics model without retraining the analytics model, said computer program product comprising:
- a non-transitory computer readable storage medium having computer readable program code embodied therewith, the computer readable program code comprising:
- computer readable program code configured to provide a cloud-based classifier which performs analytics on input data, the classifier including an analytics model;
- computer readable program code configured to receive a first data set at the classifier, wherein the first data set is a training data set;
- computer readable program code configured, via the analytics model, to discover features in the first data set;
- computer readable program code configured to receive a second input data set at the classifier;
- computer readable program code configured, via the analytics model, to discover one or more new features in the second input data set; and
- computer readable program code configured to reconfigure the analytics model, without retraining the analytics model, based on one or more new features discovered in the second input data set.

12. The computer program product according to claim 11, wherein the reconfiguring comprises modifying the analytics model.

13. The computer program product according to claim 11, wherein the reconfiguring comprises building an extension to the analytics model.

14. The computer program product according to claim 11, comprising:
- computer readable program code configured to assign weights to the features discovered in the first data set;
- wherein the reconfiguring comprises determining weights for the one or more new features discovered in the second input data set.

15. The computer program product according to claim 14, wherein the reconfiguring comprises reconfiguring the analytics model based on weights determined for the one or more new features discovered in the second input data set.

16. The computer program product according to claim 14, wherein the reconfiguring comprises recalculating the weights for the features discovered in the first data set.

17. The computer program product according to claim 16, wherein the reconfiguring comprises additionally recalculating the weights determined for the one or more new features discovered in the second input data set.

18. The computer program product according to claim 14, wherein the recalculating comprises dividing the weights for the features discovered in the first data set by a sum of weights.

19. The computer program product according to claim 11, wherein the determining of weights for the one or more new features comprises determining weights as a function of the weights assigned to features discovered in the first data set.

20. A method comprising:
- providing a classifier which performs analytics on input data sets, the classifier including an analytics model;
- inputting a first data set, wherein the first data set is a training data set;
- assigning weights to features discovered in the first data set;
- receiving a second input data set; and
- reconfiguring the analytics model based on one or more new features discovered in the second input data set, wherein said reconfiguring comprises at least one of:
- modifying the analytics model and building an extension to the analytics model;
- determining weights for the one or more new features discovered in the second input data set;
- reconfiguring the analytics model based on weights determined for the one or more new features discovered in the second input data set; and
- recalculating the weights for the features discovered in the first data set.

* * * * *